United States Patent
Mori et al.

(10) Patent No.: US 7,190,344 B2
(45) Date of Patent: Mar. 13, 2007

(54) LIQUID CRYSTAL DISPLAY DEVICE FOR VEHICLE

(75) Inventors: Kazuhiko Mori, Saitama (JP); Atsushi Hatayama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 306 days.

(21) Appl. No.: 10/257,365

(22) PCT Filed: Feb. 8, 2002

(86) PCT No.: PCT/JP02/01083

§ 371 (c)(1),
(2), (4) Date: Oct. 16, 2002

(87) PCT Pub. No.: WO02/073296

PCT Pub. Date: Sep. 19, 2002

(65) Prior Publication Data

US 2003/0151586 A1   Aug. 14, 2003

(30) Foreign Application Priority Data

Mar. 6, 2001   (JP) ............................... 2001-61705

(51) Int. Cl.
*G09G 3/36* (2006.01)

(52) U.S. Cl. .................... 345/101; 345/35; 345/102; 345/87; 345/89; 345/204; 345/211; 345/214; 340/501; 340/517; 340/523; 340/525

(58) Field of Classification Search ................ 345/101, 345/102, 87, 84, 214, 77, 89, 211, 204, 212, 345/35; 349/72; 180/65.1; 340/501, 517, 340/523, 525

See application file for complete search history.

(56) References Cited

U.S. PATENT DOCUMENTS 4,556,877 A * 12/1985 Kumagai et al. ........... 345/214

(Continued)

FOREIGN PATENT DOCUMENTS

EP   0 558 342 A1   9/1993

(Continued)

OTHER PUBLICATIONS

International Search Report.

(Continued)

*Primary Examiner*—Richard Hjerpe
*Assistant Examiner*—Jennifer T. Nguyen
(74) *Attorney, Agent, or Firm*—Westerman, Hattori, Daniels & Adrian, LLP.

(57) ABSTRACT

A vehicle-use liquid crystal display device which is capable of securing high visibility even under a low temperature environment without increasing or enlarging power consumption is provided.

A display vehicle speed Ddis is switched according to a hysteresis of ±0.7 kilometer per hour as shown in FIG. 6(*b*) under a normal or high temperature environment of not less than 45° C. with respect to a change in a vehicle speed shown in FIG. 6(*a*). Namely, even if the vehicle speed D changes between 51.4 kilometers and 52.6 kilometers, the display vehicle speed Ddis is held at 52 kilometers. The display vehicle speed Ddis is switched according to a hysteresis of ±1.0 kilometer per hour as shown in FIG. 6(*c*) under a low temperature environment of less than 45° C. Namely, even if the vehicle speed D changes between 51.1 kilometers and 52.9 kilometers, the display vehicle speed Ddis is held at 52 kilometers.

3 Claims, 6 Drawing Sheets

U.S. PATENT DOCUMENTS

| | | | |
|---|---|---|---|
| 4,795,972 A | | 1/1989 | Roppelt et al. |
| 4,857,889 A | * | 8/1989 | Terano et al. ............... 340/461 |
| 5,515,074 A | * | 5/1996 | Yamamoto ................. 345/101 |
| 5,929,833 A | * | 7/1999 | Koshobu et al. ............ 345/101 |
| 6,211,852 B1 | * | 4/2001 | Oono et al. ................. 345/102 |
| 6,313,821 B1 | * | 11/2001 | Mizuno ...................... 345/101 |
| 2002/0135711 A1 | * | 9/2002 | Mori et al. |

FOREIGN PATENT DOCUMENTS

| | | | |
|---|---|---|---|
| JP | 58-98613 | | 7/1983 |
| JP | 59-195226 | * | 6/1984 |
| JP | 59-195225 | | 11/1984 |
| JP | 59-195226 | | 11/1984 |
| JP | 04-284417 | | 10/1992 |
| JP | 10-247078 | | 9/1998 |

OTHER PUBLICATIONS

European Search Report dated Apr. 10, 2006.

* cited by examiner

… (1)

LIQUID CRYSTAL DISPLAY DEVICE FOR VEHICLE

TECHNICAL FIELD

The present invention relates to a vehicle-use liquid crystal display device. More specifically, the invention relates to the vehicle-use liquid crystal display device which is capable of obtaining high visibility even under a low temperature environment where response characteristics of liquid crystal are lowered.

BACKGROUND ART

In a liquid crystal display device, even if a drive voltage to be applied to liquid crystal is constant, the contrast changes depending upon an ambient temperature environment. Japanese Patent Application Laid-Open No. 10-31204 discloses an LCD which detects a temperature of a liquid crystal panel by means of a temperature sensor such as a thermistor and automatically adjusts a drive voltage to be applied to the liquid crystal panel based on the detected temperature.

In the liquid crystal, its phase is solidified under the low temperature environment and its response characteristics are lowered. When a liquid crystal panel is used in a vehicle-use display device, an alignment transition of the liquid crystal cannot track a change in a measured value at a vehicle speed or an engine speed that an update period of the display value is short. As a result, an overlap occurs and visibility is remarkably deteriorated. In order to solve such a technical problem, a liquid crystal display device containing a panel heater for heating a liquid crystal panel is also suggested.

When the heater is provided in order to secure the response characteristics of the liquid crystal under the low temperature environment, since the heater consumes a lot of power, a wiring capacity and a battery capacity should be enlarged. Therefore, it is difficult to apply this display device to a vehicle such as a two-wheeler where weight and a battery size are limited. Moreover, if the heater is contained in a portion such as a meter unit of the two-wheeler where its size is limited, there arises a new technical problem that other parts should be further miniaturized.

It is an object of the present invention to provide a vehicle-use liquid crystal display device which is capable of securing high visibility even under a low temperature environment without increasing power consumption and enlarging its size.

DISCLOSURE OF INVENTION

According to one aspect of the present invention, there is provided a vehicle-use liquid crystal display device, for displaying process data such as a vehicle speed and an engine speed changing according to an operating state of a vehicle on a liquid crystal display panel, including: temperature detection means for detecting a temperature of the liquid crystal panel; and display control means for displaying the process data on the liquid crystal panel. The display control means makes a hysteresis of display switching of the process data according to the change in the process data larger within a temperature range where the temperature of the liquid crystal panel is lower than a predetermined reference temperature than within a high temperature range.

According to the above characteristic, the hysteresis of the display switching becomes larger according to the change in the process data under the low temperature environment in comparison with the high or normal temperature environment, and hence a display switching period becomes longer. Therefore, an alignment transition of liquid crystal can track the display switching so that visibility is improved.

BEST MODE FOR EMBODYING THE INVENTION

There will be detailed below a vehicle-use liquid crystal display device according to a preferred embodiment of the present invention with reference to the drawings.

Figure 7:
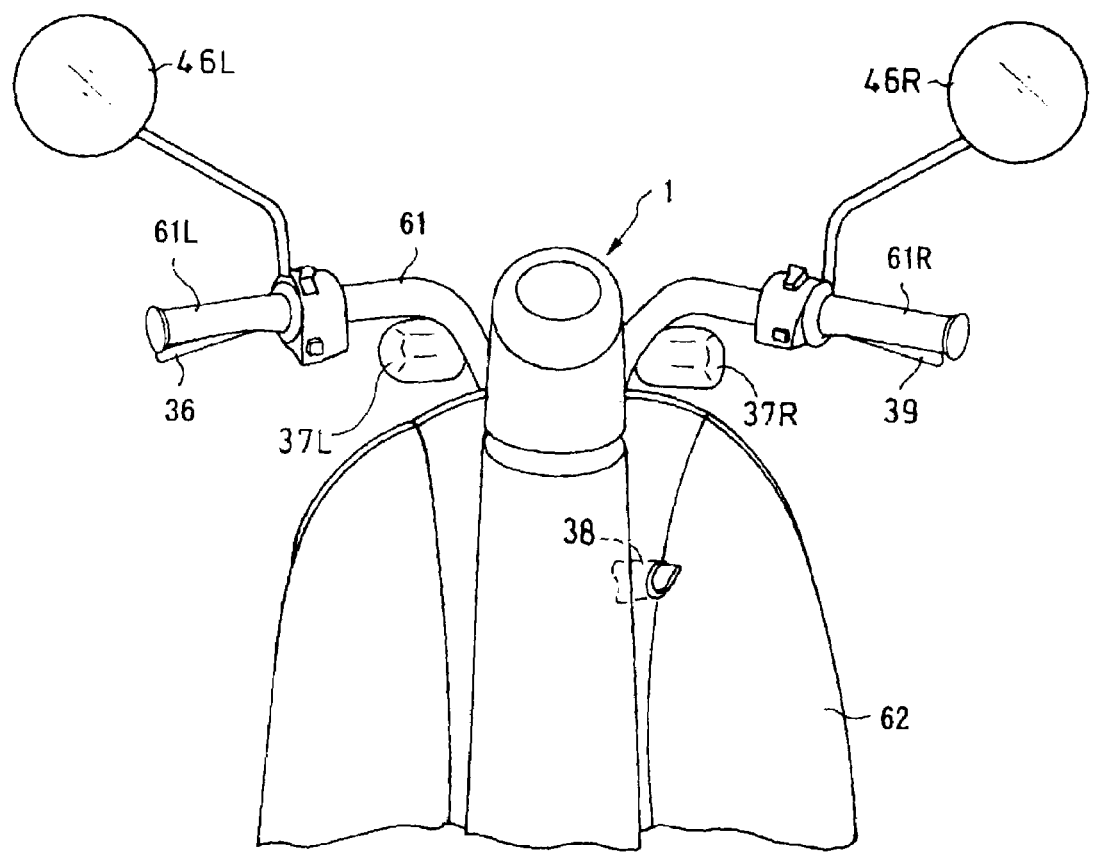
FIG. 7 is a front view showing a main section of a two-wheeler to which the vehicle-use liquid crystal display device of the present invention is applied.

FIG. 7 is a front view showing a main section of a two-wheeler to which a vehicle-use liquid crystal display device 1 of the present invention is applied. The vehicle-use liquid crystal display device 1 is attached to a center portion of a handlebar 61, and directional signals 37L, 37R are provided respectively to right and left of the handlebar 61 so as to be extended. A power source switch 38 which can be operated by a power source key is provided to the right side of a leg shield 62 in a vehicle body.

A front wheel-use brake lever 39 is provided to a right grip 61R of the handlebar 61, and a rear wheel-use brake lever 36 is provided to a left grip 61L. Mirrors 46L, 46R are provided respectively to the left and right of the handlebar 61.

Figure 1:
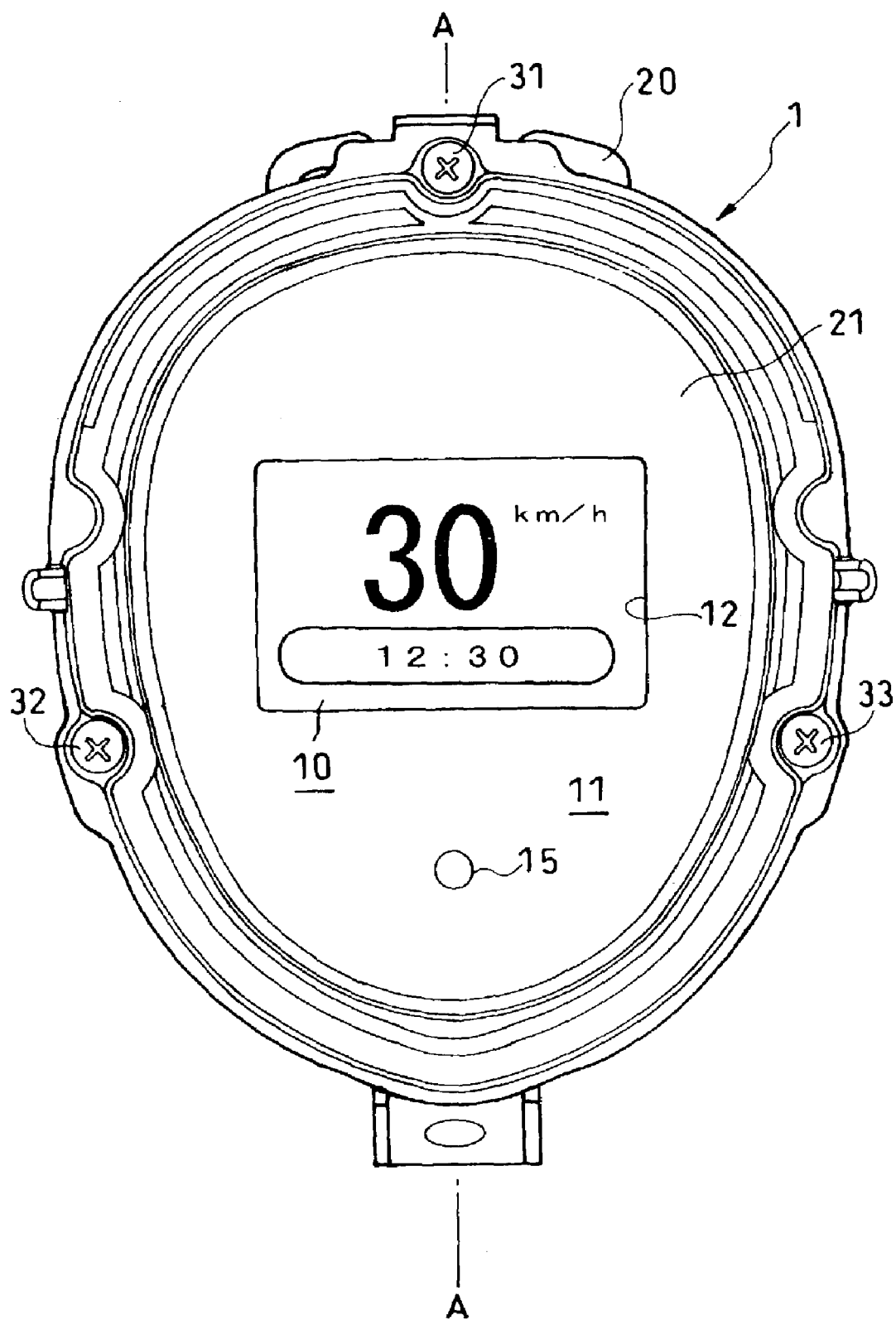
FIG. 1 is a front view showing a vehicle-use liquid crystal display device to which the present invention is applied.
Figure 2:
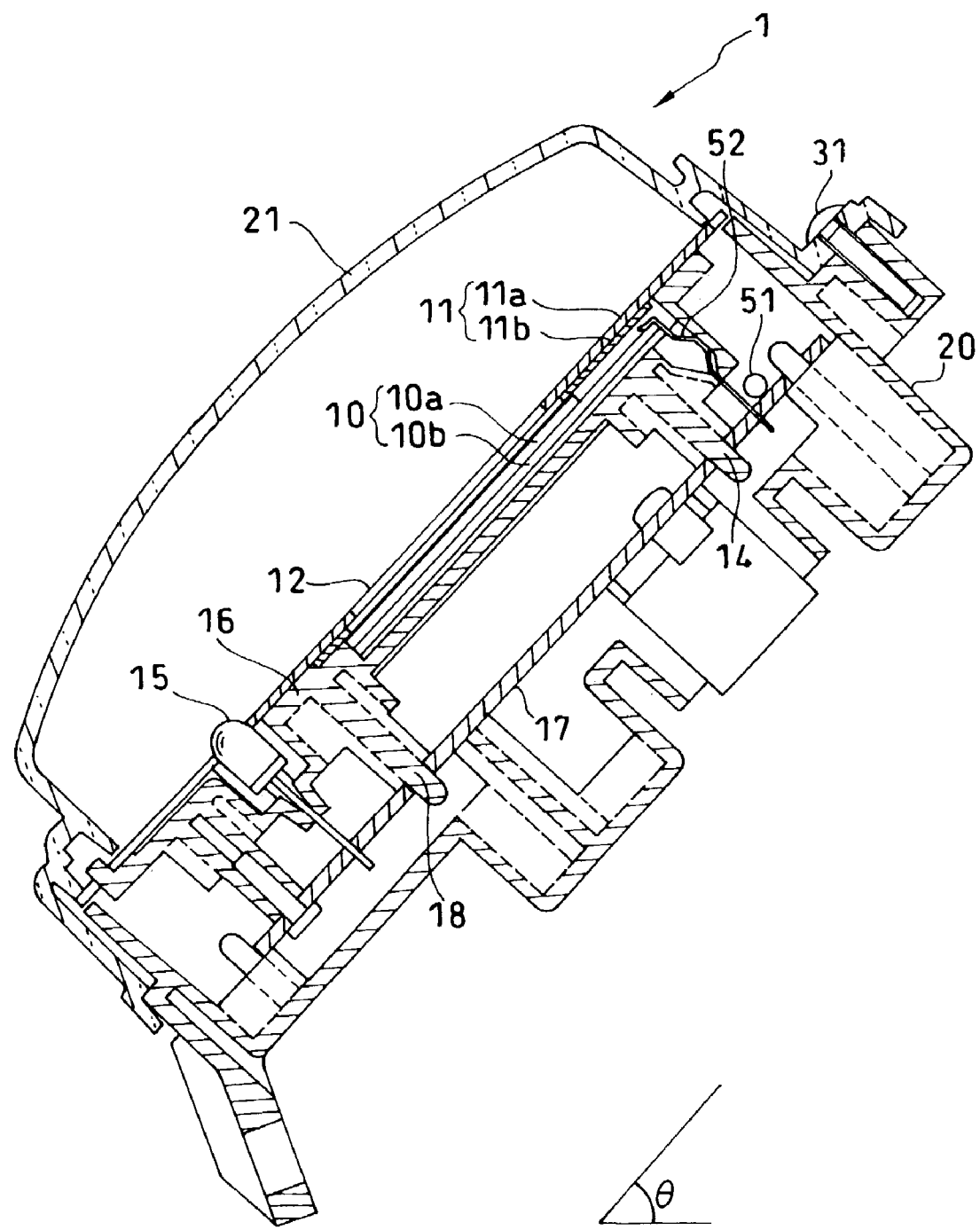
FIG. 2 is a cross sectional view taken along line A—A of FIG. 1.

FIG. 1 is a front view of the vehicle-use liquid crystal display device 1. FIG. 2 is a cross sectional view taken along line A—A of FIG. 1. Since the vehicle-use liquid crystal display device 1 of the present embodiment is tilted by an angle θ to a front-rear direction so as to be attached to the vehicle, the cross sectional view of FIG. 2 is tilted by the angle θ.

In the present embodiment, an opaque supporting case 20 and a translucent case cover 21 compose a housing, and both of them are fixed at three places by screws 31, 32, 33. In the housing, a liquid crystal panel 10 where liquid crystal is sealed between two glass plates 10a, 10b is held by a liquid crystal holder 16. On this liquid crystal panel 10, various process data such as a vehicle speed, an engine speed, a water temperature and a fuel residue are displayed. A solar collecting plate 11 having an opening 12 for exposing the display surface is provided to an exposed surface side of the liquid crystal panel 10 so as to surround the display surface of the liquid crystal panel 10.

The solar collecting plate 11 is composed of an opaque resin panel 11a and an insulative cushion material 11b which clads to surround the opening 12 on the rear surface of the panel 11a. The opaque resin panel 11a, which is irradiated directly with a sunbeam transmitted through the case cover 21, comes in contact with the liquid crystal panel 10 via the insulative cushion material 11b.

The liquid crystal holder 16 is provided to stand on a circuit substrate 17 by means of its leg portions 14, 18. An illumination LED 15 is provided to stand on the circuit substrate 17, and the end of its light emitting portion is exposed to the outside through the opening provided on the solar collecting plate 11. The circuit substrate 17 is mounted with circuit elements, such as an LCD driver (not shown) for driving the liquid crystal panel 10, an LED driver (not shown) for driving the illumination LED 15, a temperature sensor 51 for detecting an ambient temperature of the circuit substrate 17 and a temperature detection circuit (not shown) for controlling the LCD driver based on the temperature information detected by the temperature sensor 51. The liquid crystal panel 10 is electrically connected with the circuit substrate 17 by an electrode 52.

Figure 3:
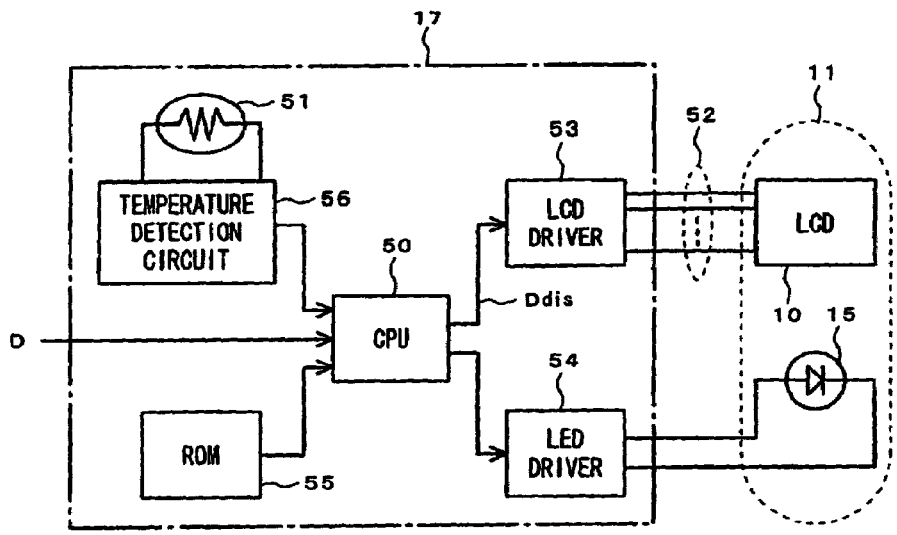
FIG. 3 is a block diagram functionally showing a circuit configuration of the vehicle-use liquid crystal display device to which the present invention is applied.

FIG. 3 is a block diagram functionally showing a circuit configuration of the vehicle-use liquid crystal display device 1.

The LCD driver 53 supplies a liquid crystal drive signal to the liquid crystal panel (LCD) 10 in response to an instruction from a CPU 50. The LED driver 54 supplies an LED drive electric current to the LED 15 in response to an instruction from the CPU 50. The temperature detection circuit 56 converts a resistance value of the temperature sensor 51 (in the present embodiment, a thermistor) into temperature information. The CPU 50 captures the process data D, such as a vehicle speed and an engine speed, and outputs display values Ddis to the LCD driver 53. Various control programs and reference values are stored in a ROM 55.

Figure 4:
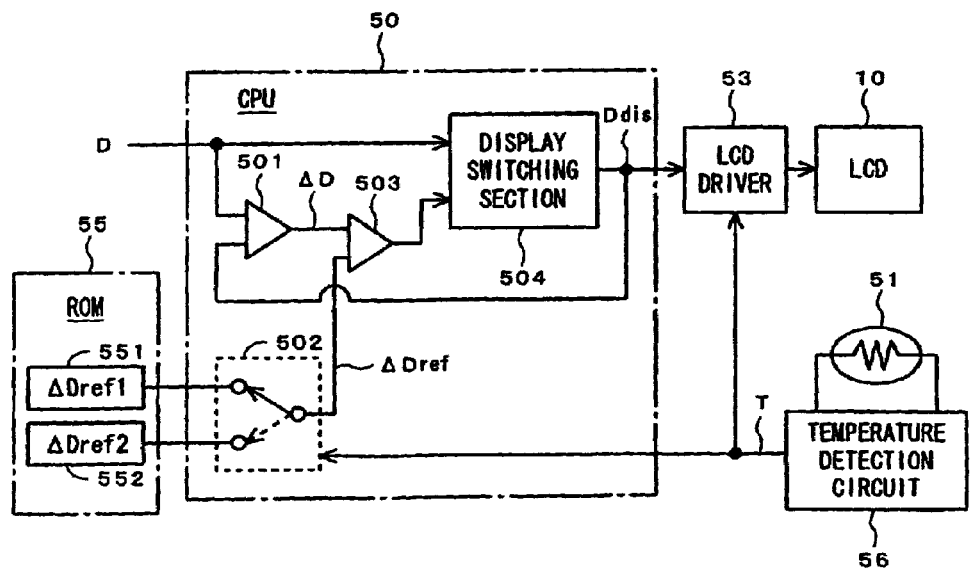
FIG. 4 is a functional block diagram of a CPU 50 of FIG. 1.

FIG. 4 is a functional block diagram of the CPU 50.

In the CPU 50, a first comparator 501 compares the current process data D with the current display value Ddis so as to output their differential value ΔD. A second comparator 503 compares a reference differential value ΔDref (ΔDref1 or ΔDref2) output from a reference differential value selector 502, mentioned later, with the differential value ΔD and outputs a display switching signal when the differential value ΔD exceeds the reference differential value ΔDref. A display switching section 504 updates the display value Ddis to a value according to the process data D in response to the display switching signal.

A first reference differential value ΔDref1 as the reference differential value ΔDref under the high or normal temperature environment is recorded in a first storage section 551 of the ROM 55. A second reference differential value ΔDref2 as the reference differential value ΔDref under the low temperature environment is recorded in a second storage section 552. The selector 502 selects the first reference differential value ΔDref1 of the first storage section 551 under the high or normal temperature environment based on temperature information T provided from the temperature detection circuit 56, and selects the second reference differential value ΔDref2 of the second storage section 552 under the low temperature environment.

Figure 5:
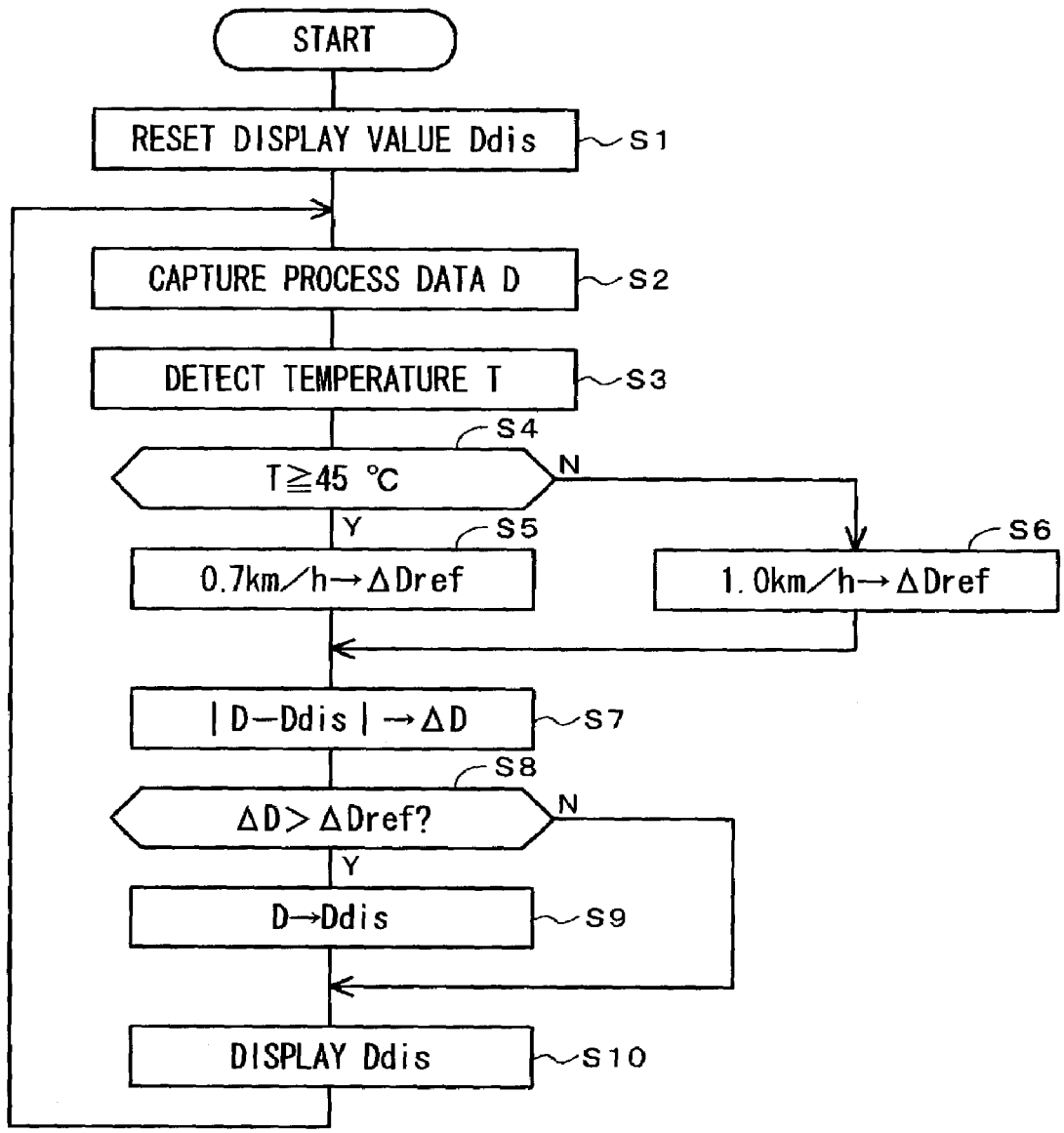
FIG. 5 is a flowchart showing an operation of a present embodiment.

FIG. 5 is a flowchart showing the operation of the present embodiment and mainly shows the operation of the CPU 50.

At step S1 the display value Ddis displayed on the liquid crystal panel 10 is reset. At step S2 the process data D are captured by the CPU 50. At step S3 the temperature T of the liquid crystal panel 10 detected by the temperature detection circuit 56 is captured by the CPU 50. There will be explained below the process data D captured by the CPU 50 which are limited to the vehicle speed.

At step S4 a determination is made as to whether or not the current temperature T is higher than 45° C. When the temperature T is under the high or normal temperature environment of not less than 45° C., at step 5 the selector 502 selects the first storage section 551 and outputs the first reference differential value ΔDref1 as the reference differential value ΔDref. In the present embodiment, 0.4 kilometers per hour is recorded as the first reference differential value ΔDref1.

On the contrary, when the temperature T is under the low temperature environment of less than 45° C., at step S6 the selector 502 selects the second storage section 552 and outputs the second reference differential value ΔDref2 as the reference differential value ΔDref. In the present embodiment, 1.0 kilometer per hour is recorded as the second reference differential value ΔDref2.

At step S7 an absolute value of a difference between the process data D and the current display vehicle speed Ddis of the liquid crystal panel 10 is obtained as a differential value ΔD in the first comparator 501. At step S8 the differential value ΔD is compared with the reference differential value ΔDref in the second comparator 503.

When the differential value ΔD exceeds the reference differential value ΔDref, at step S9 the display vehicle speed Ddis is updated to the current process data D in the display switching section 504. At step S10 the display vehicle speed Ddis is displayed on the liquid crystal panel 10. On the contrary, when the differential value ΔD does not exceed the reference differential value ΔDref, the current display vehicle speed Ddis is continued to be displayed.

Figure 6:
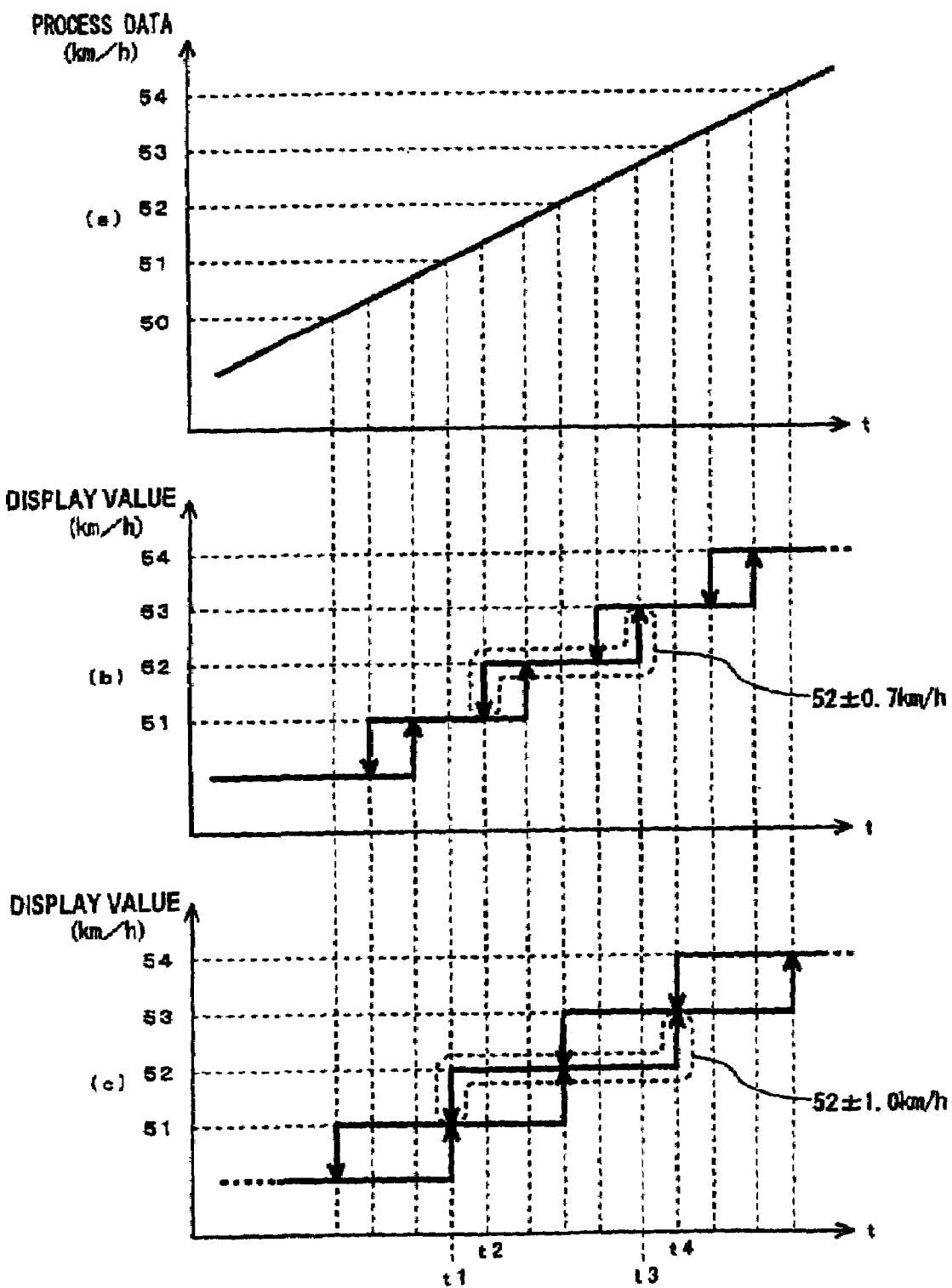
FIGS. 6(a), 6(b) and 6(c) are timing charts showing a relationship between process data D and a display value Ddis.

FIGS. 6(a), 6(b) and 6(c) are timing charts showing a relationship between the process data D and the display value Ddis in the present embodiment.

In the present embodiment, the display vehicle speed Ddis is switched according to hysteresis of ±0.7 kilometer per hour as shown in FIG. 6(b) under the normal or high temperature environment of not less than 45° C. with respect to the change in the vehicle speed shown in FIG. 6(a).

Namely, in the case where the display vehicle speed Ddis is 52 kilometers per hour, when the process data D rise to 52.7 kilometers at time t3, the display vehicle speed Ddis is updated to 53 kilometers per hour. When the process data D drop to 51.3 kilometers at time t2, the display vehicle speed Ddis is updated to 51 kilometers per hour. Even if the process data D change between 51.4 kilometers and 52.6 kilometers, the display vehicle speed Ddis is held at 52 kilometers per hour.

On the contrary, as shown in FIG. 6(c), the display vehicle speed Ddis is switched according to hysteresis of ±1.0 kilometer per hour under the low temperature environment of less than 45° C. Namely, in the case where the display vehicle speed Ddis is 52 kilometers per hour, when the process data D rise to 53.0 kilometers at time t4, the display vehicle speed Ddis is updated to 53 kilometers per hour. When the process data D drop to 51.0 kilometers at time t1, the display vehicle speed Ddis is updated to 51 kilometers per hour. Even if the process data D change between 51.1 kilometers and 52.9 kilometers, the display vehicle speed Ddis is held at 52 kilometers.

According to the present embodiment, the hysteresis of the display switching with respect to the change in the process data D becomes larger under the low temperature environment in comparison with the high or normal temperature environment. As a result, the switching period of the display value Ddis becomes longer, and hence an alignment transition of the liquid crystal can track the display switching so that the visibility is improved.

The above embodiment explained that the hysteresis of the display switching differs depending on the low temperature environment and the high or normal temperature environment. However, the present invention is not limited only to this, namely, the hysteresis of the display switching is set under the low temperature environment and the hysteresis not set under the high or normal temperature environment so that the display data D may be directly displayed.

INDUSTRIAL APPLICABILITY

According to the present invention, the hysteresis of the display switching with respect to the change in the process data D becomes larger under the low temperature environment in comparison with the high or normal temperature environment. As a result, the switching period of the display value Ddis becomes longer, and hence an alignment transition of the liquid crystal can track the display switching so that the visibility is improved.

The invention claimed is:

1. A vehicle-use liquid crystal display device for displaying process data D such as a vehicle speed and an engine speed changing according to an operating state of a vehicle on a liquid crystal display panel, said liquid crystal display device comprising:

temperature detection means for detecting a temperature of said liquid crystal panel; and display control means for displaying the process data D on said liquid crystal panel, wherein said display control means obtains a difference $\Delta D$ between the process data D and a display value Ddis, and when an absolute value of the difference $\Delta D$ exceeds a first reference value $\Delta Dref1$, switches display from a current display value into a new display value in response to the process data D within a temperature range in which the temperature of said liquid crystal panel is higher than a predetermined reference temperature, and does not switch the display value within the temperature range in which the temperature of said liquid crystal panel is lower than the predetermined reference temperature until the absolute value of the difference $\Delta D$ exceeds a second reference value $\Delta Dref2$ which is larger than the first reference value $\Delta Dref1$.

2. A vehicle-use liquid crystal display device according to claim 1, wherein the first reference value is zero.

3. A vehicle-use liquid crystal display device according to claim 1, wherein the second reference value is set to a value below the display resolution so that the display values should change continuously even within the temperature range where the temperature on the liquid crystal panel is lower than a specified reference temperature.

* * * * *